US010839135B1

(12) United States Patent
Terkowitz et al.

(10) Patent No.: US 10,839,135 B1
(45) Date of Patent: Nov. 17, 2020

(54) DETECTION OF ACCESS TO TEXT-BASED TRANSMISSIONS

(71) Applicant: Amazon Technologies, Inc., Seattle, WA (US)

(72) Inventors: Michael Sturgis Terkowitz, Seattle, WA (US); Seema Pradeep Degwekar, Seattle, WA (US); Daryl Melvin Joel Harrison, Seattle, WA (US); Nathan David Weill Nadel, Seattle, WA (US); Katrina Shackelford, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 149 days.

(21) Appl. No.: 15/861,547

(22) Filed: Jan. 3, 2018

(51) Int. Cl.
*G06F 40/10* (2020.01)
*H04L 12/58* (2006.01)
*G06F 40/20* (2020.01)
*G06F 21/16* (2013.01)
*G06F 21/10* (2013.01)

(52) U.S. Cl.
CPC .............. *G06F 40/10* (2020.01); *G06F 21/10* (2013.01); *G06F 21/16* (2013.01); *G06F 40/20* (2020.01); *H04L 51/00* (2013.01)

(58) Field of Classification Search
CPC ....... G06F 17/2211; G06F 21/10; G06F 21/16
See application file for complete search history.

(56) References Cited

U.S. PATENT DOCUMENTS

| 5,953,415 | A  | * | 9/1999  | Nielsen ................. G06F 21/10 705/51 |
| 6,189,000 | B1 | * | 2/2001  | Gwertzman ............ H04L 29/06 |
| 6,233,684 | B1 | * | 5/2001  | Stefik ...................... G06F 21/10 713/176 |
| 7,610,382 | B1 | * | 10/2009 | Siegel ................. G06F 17/2264 704/10 |
| 2002/0138248 | A1 | * | 9/2002  | Corston-Oliver ..... G06F 17/271 704/1 |
| 2002/0156774 | A1 | * | 10/2002 | Beauregard ......... G06F 9/45512 |
| 2002/0172425 | A1 | * | 11/2002 | Venkatesan ......... G06F 17/2211 382/229 |
| 2005/0114840 | A1 | * | 5/2005  | Zeidman .................. G06F 8/71 717/126 |
| 2007/0106494 | A1 | * | 5/2007  | Detlef ................... G06F 17/273 704/9 |
| 2007/0164882 | A1 | * | 7/2007  | Monro .............. G06F 16/90344 341/51 |
| 2008/0033913 | A1 | * | 2/2008  | Winburn ................. G06F 21/10 |
| 2008/0189380 | A1 | * | 8/2008  | Bosworth .............. G06Q 10/10 709/207 |

(Continued)

*Primary Examiner* — Samuel G Neway
(74) *Attorney, Agent, or Firm* — Davis Wright Tremaine LLP

(57) ABSTRACT

A service provider receives a request to obtain a text-based transmission. In response to the request, the service provider generates an identifier corresponding to the request and, based at least in part on the identifier and text to be included in the transmission, determines a set of textual transformations to associate with the identifier. The service provider modifies the text in accordance with the set of textual transformations and provides the modified text to the requestor as the text-based transmission.

20 Claims, 7 Drawing Sheets

(56) References Cited

U.S. PATENT DOCUMENTS

| | | | |
|---|---|---|---|
| 2010/0017850 A1* | 1/2010 | More | G06F 21/62 |
| | | | 726/2 |
| 2014/0075566 A1* | 3/2014 | Farkash | G06F 16/31 |
| | | | 726/26 |
| 2014/0157308 A1* | 6/2014 | Ahern | H04L 65/605 |
| | | | 725/35 |

* cited by examiner

DETECTION OF ACCESS TO TEXT-BASED TRANSMISSIONS

BACKGROUND

Providers of digital media often utilize copy detection mechanisms to detect if a digital media file has been copied without authorization and to identify the entity (e.g., customer, user, etc.) that has performed this action. For instance, a provider of digital media can encode imperceptible information in the digital media, such as through slight variations in pixels in an image or slight variations in a music track. The modified data can be compared with the original to identify the encoded information. However, copy detection mechanisms for text-based transmissions are difficult to implement, as these text-based transmissions are substantially less data intensive than other digital media files.

BRIEF DESCRIPTION OF THE DRAWINGS

Various techniques will be described with reference to the drawings, in which.

DETAILED DESCRIPTION

Figure 1:
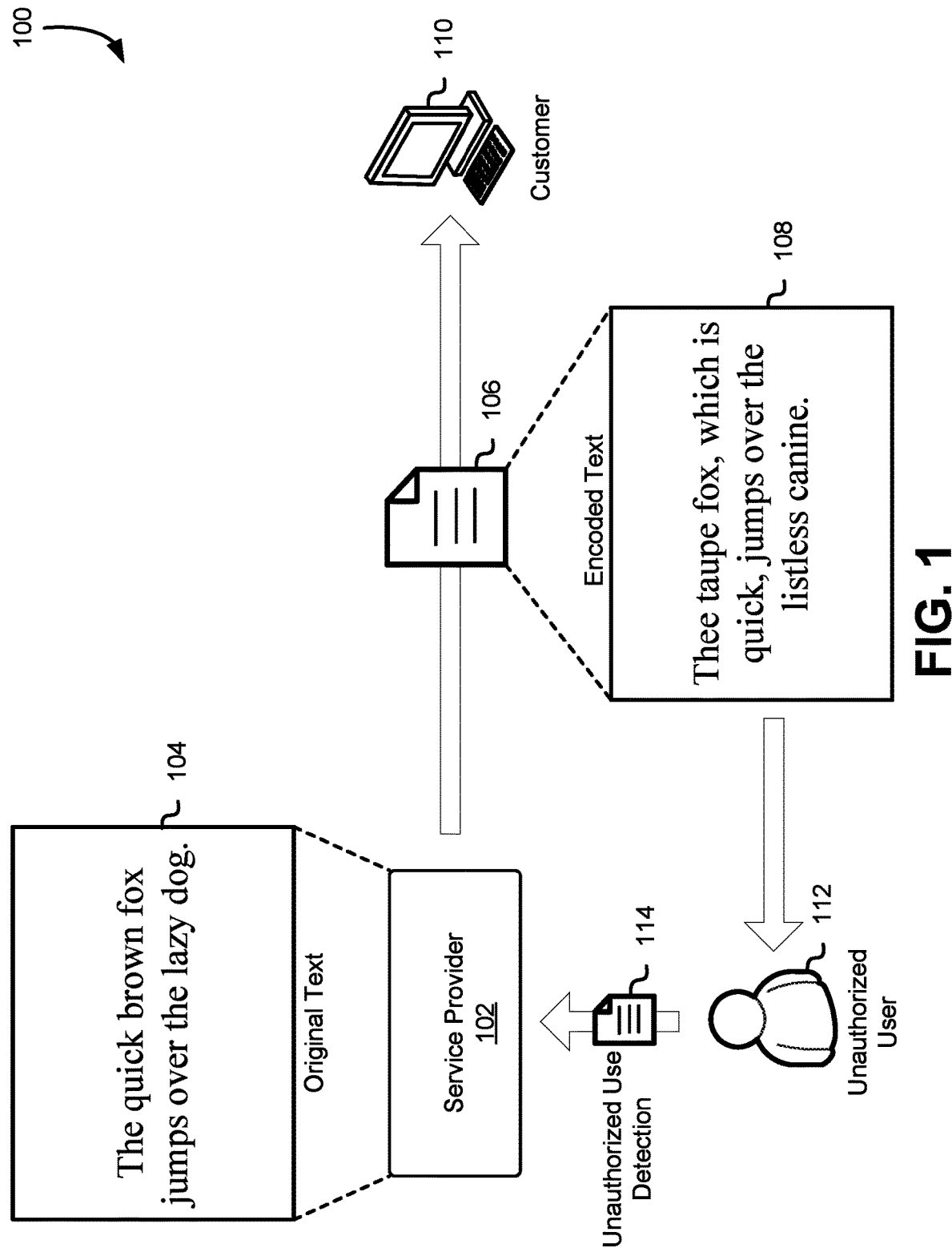
FIG. 1 shows an illustrative example of an environment in which various embodiments can be implemented.

This patent disclosure relates to the modification of text-based transmissions to encode information usable to identify unauthorized copying of the transmissions and the entities responsible. In one example, a service provider receives a request from a customer to obtain a text-based transmission (e.g., product information, file, etc.). The customer may not be authorized to provide this text-based transmission to other entities or to use the text-based transmission for other purposes than those specified by the service provider. In an example, in response to the request, the service provider obtains the text-based information that is to be included in the transmission and identifies a unique signal that is to be embedded within the text-based information. This unique signal may include a combination of semantic and syntactic substitution of portions of the text-based information. For instance, the service provider may replace a word or grammatical structure within a portion of the text-based information with other words or grammatical structure that has a similar or identical meaning. Additionally, the service provider may modify the text-based information by re-ordering letters in various words to change the syntax of these words. These modifications to the text-based information are unique to the customer.

In an example, the service provider modifies the text-based information to encode a unique user identifier for the customer. For instance, each possible modification of the text-based information is assigned a value, which can be used to encode the unique user identifier. Thus, if the customer is assigned with a unique user identifier, the service provider determines what modifications (e.g., semantic and/or syntactic) to the text-based information may be used to encode the unique user identifier. The service provider may provide a text-based transmission to the customer that includes the modified text-based information. The service provider, in one example, stores the modified text-based information to enable analysis of incoming text-based transmissions from various sources and to allow for error correction in the event that an unauthorized entity or other entity (e.g., customer) further modifies the modified text-based information.

In an example, the service provider monitors various web servers to identify any text-based transmissions that were originally provided by the service provider and have been reproduced or used for another purpose not authorized by the service provider. For instance, the service provider may obtain data logs from a particular web server. These data logs may include text-based information that have been provided by other users or obtained through other methods. The service provider may parse this data to identify any text-based information that was provided by the service provider. This may include a comparison of the data with existing text-based information (e.g., original and modified) stored by the service provider. If the original text-based information is identified, the service provider may compare the text-based information from the data logs to the original text-based information to obtain the encoded information. In an example, the service provider utilizes the encoded information to identify the unique identifier for the customer that disseminated the modified text-based information to the particular web server or to other entities that may have provided the modified text-based information to the particular web server.

In this manner, a service provider can encode information corresponding to a unique user identifier for a customer or other data into a text-based transmission in a manner that is imperceptible to the customer or other entities. Additionally, the techniques described and suggested herein facilitate additional technical advantages. For example, because the encoded information is used to identify the customer to which the text-based transmission was supplied, the service provider may contact the customer directly to indicate that the text-based transmission has been compromised and that the customer is the source. Further, the service provider may perform other remedial actions to address this unauthorized access to the text-based transmission provided to the customer. Additionally, since the service provider utilizes error correction techniques to identify the encoded information in a text-based transmission, the service provider may narrow a breach down to a minimal number of customers, thus narrowly tailoring a remedial response to a limited number of customers or other entities rather than performing remedial actions that may impact a wide array of customers.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implemented. In the environment 100, a customer 110 of a service provider 102 submits a request to the service provider 102 to obtain a text-based transmission that includes text-based information. The service provider 102 may be an online retailer that provides product information to developers to integrate onto their own online marketplaces and serve as a third-party retailer for the service provider 102. Alternatively, the service provider 102 may provide copyrighted materials to its customers, which may be subscribers to a document service provided by the service provider 102. The request from the customer 110 may be provided in an application programming interface (API) call to the service provider 102. This API call may include credential information for the customer 110 (e.g., username/password, cryptographic keys, etc.), which the service provider 102 may utilize to determine whether the customer 110 is authorized to obtain the requested text-based information. If the customer 110 is not authorized to access the requested text-based information, the service provider 102 may deny the customer's request and prevent dissemination of the requested text-based information to the customer 110.

If the customer 110 is authorized to obtain the requested text-based information, the service provider identifies the original text 104 that comprises the information requested by the customer 110. The original text 104, in an embodiment, serves as the basis, or seed, for generating a text-based transmission that incorporates the requested text-based information. In one embodiment, the service provider 102 maintains a data table that specifies each possible semantic or syntactic transformation that can be made to the original text 104 to encode information. Each possible transformation may correspond to a particular bit within a bit string. Alternatively, each possible transformation may correspond to a particular alphanumerical value. In an embodiment, in response to the request from the customer 110, the service provider 102 assigns the customer 110 with a unique identifier that is encoded into the original text 104. The unique identifier may include a customer identifier (e.g., the identifier of the authenticated customer 110 invoking the API), an API-specific customer identifier (e.g., a salted identifier of the authenticated customer 110), or a Universally Unique Identifier (UUID), which is unique to each request.

The service provider 102 may use the unique identifier for the customer 110 to determine which transformations to perform on the original text 104 to encode the unique identifier in the text. For instance, if each possible transformation corresponds to a particular bit in a bit string, the service provider 102 may convert the unique identifier into a series of bits. This series of bits are used to determine what transformations are to be performed to the original text 104 to encode the unique identifier. Alternatively, if each possible transformation is assigned an alphanumeric value, the service provider 102 may use each character of the unique identifier to identify the individual transformations that, if implemented, would correspond to the alphanumeric characters of the unique identifier. In this manner, the service provider 102 selects the unique set of transformations that are to be performed on the original text 104 to create the encoded text 108 that is to be provided to the customer 110 via a text-based transmission 106.

As noted above, the transformations to the original text 104 may include semantic and/or syntactic transformations. For example, as illustrated in FIG. 1, the original text, which includes the expression "The quick brown fox jumps over the lazy dog" is transformed using semantic and syntactic transformations to "Thee taupe fox, which is quick, jumps over the listless canine." Semantic transformations may involve replacing words or grammatical structures with others of similar or identical meaning. For example, using the example above, the original text 104 is modified to replace "brown" with "taupe" to indicate the color of the fox. Additionally, the adjective "quick" is replaced with the clause "which is quick" after the word "fox." Other semantic changes include changing the adjective "lazy" to "listless" and the noun "dog" to "canine." These changes, while seemingly significant relative to the original text 104, still convey the same semantic meaning. However, without the original text 104, the customer 110 is unable to compensate for these modifications.

In an embodiment, for each possible semantic transformation identified by the service provider 102, a text encoding sub-system of the service provider 102 can use each transformation as binary code, whereby if a transformation is present, the text encoding sub-system assigns a value of "on." Alternatively, if a transformation is not present within the encoded text 108, the text encoding sub-system assigns a value of "off." This may be used to generate a binary string that corresponds to the unique identifier assigned to the customer 110 or to the particular request from the customer 110. In some embodiments, more than two values are assigned to each possible semantic transformation. For example, the word "brown" in the original text 104 can be substituted with "taupe," as in the encoded text 108 or the word "chocolate." If more than two values are assigned to a particular transformation, a data table is utilized to indicate the encoded value.

Syntactic transformation of the original text 104, in an embodiment, involves modifying the original text 104 in a way that renders the encoded text 108 human-readable but with one or more modifications to the syntax of the original text 104. For example, as illustrated in FIG. 1, the capitalized word "The" in the original text 104 is modified to include an extra character, becoming "Thee" in the encoded text 108. This modification may correspond to a particular bit in a string of bits that correspond to the unique identifier of the customer 110. In some instances, the service provider 102 may re-order the letters in words within the original text 104. For example, re-ordered characters may be used to indicate an "on" bit and non-re-ordered characters may be used to indicate an "off" bit. Other types of syntactic modification may be used as well in conjunction or instead of those described above. These may include use of empty spaces (e.g., adding a second space between words, adding trailing spaces, etc.), using alternative alphanumerical systems (e.g., leetspeak, whereby one or more characters in a word are replaced with other characters, etc.), and the like.

While semantic and syntactic transformations are used throughout the present disclosure for the purpose of illustration, other transformations may be used to encode information into the original text 104. For instance, font changes may be used to encode information into the original text 104. For example, one or more letters of a word that is in one font may be converted into another font. Similarly, the font size for these one or more letters may be changed to encode information. Additionally, or alternatively, the service provider 102 may abbreviate certain words in the original text 104 (e.g., "vs." instead of "versus," etc.) to encode information into the original text 104. The opposite may also be used, whereby an abbreviation in the original text 104 is replaced with the complete word or words. Other possible modifications include use of breaking and non-breaking spaces, punctuation changes (e.g., comma vs. semicolon, etc.), use of characters from different character sets, use of numeric characters and actual spelling of a number (e.g., "1" vs. "one", "first" vs. "1$^{st}$," etc.), use of em-dashes and en-dashes, use of symbols in place of words in the original text 104 and vice versa (e.g., "&" instead of "and," "$" instead of "dollars," etc.), and the like. It should be noted that a numeric transformation includes both numerical digit to numeral name and numeral name to numerical digit transformations.

The service provider 102 may utilize syntactic and semantic transformations to modify the original text 104 such that the modifications correspond to the unique identifier created for the customer 110 or for the request itself. This information may be stored within a database, along with the original text 104 and the encoded text 108. Further, the service provider 102 may provide the customer 110 with a text-based transmission 106 that includes the encoded text 108, thus fulfilling the customer's request. In some embodiments, the service provider 102 generates a hash of the text-based transmission and stores this hash within a database of hashes. Thus, if the service provider 102 receives text that is suspected to have been used in an unauthorized manner, the service provider 102 may hash this text and compare this hash against the hashes of all vended text-based information. If a match is found, and the text is identical, then the encoded information is usable to identify the customer to which the text-based transmission 106 was provided.

In an embodiment, the service provider 102 monitors various web servers and data logs from third-party sources to determine whether any text-based transmissions from the service provider 102 to customers have been disseminated to one or more unauthorized users 112. For instance, the service provider 102 may compare a data log 114 obtained from a third-party source (e.g., an unauthorized user 112 or other entity, such as a server for an online marketplace, etc.) with known encoded text information to determine whether the data log 114 contains any encoded text 108. If so, the service provider 102 obtains the corresponding original text 104 from the database and compares the encoded text 108 to the original text 104 to obtain the encoded information. Using the data table described above, the service provider 102 may use the encoded information to identify the customer 110 to which the text-based transmission 106 was provided.

The service provider 102, in response to identifying the customer 110 that disseminated the text-based transmission 106 to an unauthorized user 112 or that otherwise is the source of the leaked text-based transmission 106, may perform one or more remedial actions to address this detection of unauthorized access to the text-based transmission 106. For instance, the service provider 102 may terminate the customer's authorization to access further text-based information from the service provider 102. Additionally or alternatively, the service provider 102 may transmit a notification to the customer 110 to indicate that the text-based transmission 106 provided to the customer 110 has been compromised. This may allow the customer 110 to perform its own remedial actions to identify how the text-based transmission 106 was compromised and address the issues.

In an embodiment, the service provider 102 receives one or more data logs 114 that include text-based information that includes encoded information that does not correspond to a particular customer 110. For example, encoded information may be changed through use of a spell checking mechanism, resulting in a segment of the encoded information being removed from the text-based transmission 106. If the encoded information does not correspond to a particular customer 110, the service provider 102 may perform an error correction process to identify potential customers to which the encoded text was provided. This may include identifying one or more bits within the bit string that result in unique differences between unique identifiers of customers and requests and the bit string resulting from the received encoded information. The service provider 102 may define a limit to the number of variant bits that are used to identify the potential customers that may have disseminated their corresponding text-based transmissions without authorization from the service provider 102. For instance, if a customer's unique identifier corresponds to a bit string that is one bit different from the bit string obtained from the received data log 114, then the customer 110 may be flagged as being a potential source of the unauthorized dissemination of the text-based transmission 106. This may allow the service provider 102 to limit the number of customers subject to remedial action as a result of text-based transmissions being disseminated without authorization to unauthorized users 112.

Figure 2:
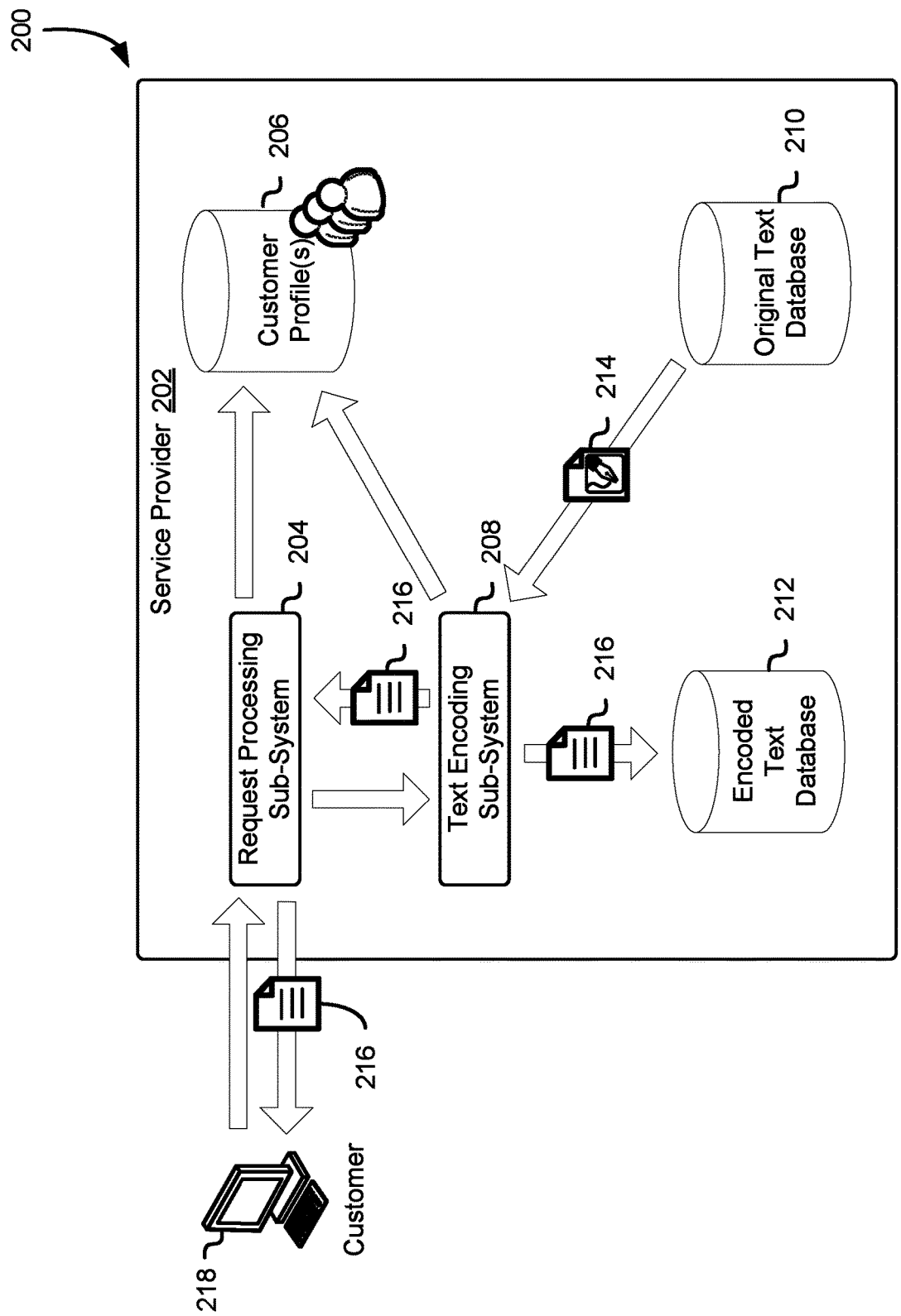
FIG. 2 shows an illustrative example of an environment in which a text-based transmission is modified to encode information usable to identify a customer to which the transmission is provided in accordance with at least one embodiment.

As noted above, the service provider, in response to a request from a customer to obtain a text-based transmission, may encode the text-based information included in the transmission with encoded information usable to identify the customer to which the transmission was provided or the particular request. Accordingly, FIG. 2 shows an illustrative example of an environment 200 in which a text-based transmission 216 is modified to encode information usable to identify a customer 218 to which the text-based transmission 216 is provided in accordance with at least one embodiment. In the environment 200, a customer 218 of a service provider 202 submits a request to a request processing sub-system 204 of the service provider 202 to obtain a text-based transmission 216. The request may identify the text that the customer 218 desires (e.g., product information, an electronic book or document, etc.), as well as credential information usable by the request processing sub-system 204 to authenticate the customer 218 and to determine whether the customer 218 is authorized to access the requested text. In an embodiment, the request from the customer 218 is provided via an API call to the request processing sub-system 204, whereby the API call specifies the requested text and the credential information.

The request processing sub-system 204 is a computer system or application installed on a computer system of the service provider 202 that evaluates incoming requests to determine whether text-based information may be vended to the requestors. In response to the request from the customer 218, the request processing sub-system 204 may evaluate the provided credential information to determine whether the customer 218 is authorized to access the requested text-based information. For instance, the request processing sub-system 204 may access a customer profile 206 corresponding to the customer 218 to identify any applicable policies. Using these policies, the request processing sub-system 204 may determine whether the customer 218 has been granted access by an administrator or owner of the text-based information to access the text-based information. Additionally, the request processing sub-system 204 may use the provided credential information to determine whether the customer 218 can be authenticated. For instance, if the API request includes a digital signature, the request processing sub-system 204 may utilize a cryptographic key for the customer 218, from the customer profile 206, and the body of the API request to generate an expected digital signature that may be used to determine whether the provided digital signature is authentic. If the digital signatures match, then the request is authenticated. In some embodiments, the API request includes a representation of the user's set of credentials. The request processing sub-system 204 may evaluate this representation of the set of the credentials to determine their validity such that if they are valid, then the API request is authentic.

If the customer 218 is authenticated and is authorized to access the requested text-based information, the request processing sub-system 204 may transmit a request to a text encoding sub-system to obtain the requested text-based information and to encode a unique identifier of the customer 218 or of the API request itself into the text-based information. As noted above, in response to the request from the customer 218, the request processing sub-system 204 assigns the customer 218 with a unique identifier. The unique identifier may include a customer identifier (e.g., the identifier of the authenticated customer 218 invoking the API), an API-specific customer identifier (e.g., a salted identifier of the authenticated customer 218), or a UUID, which is unique to each request. In an embodiment, if the request processing sub-system 204 utilizes a unique customer identifier, the request processing sub-system 204 may access the customer profile 206 to determine whether a unique customer identifier has been previously assigned to the customer 218. If so, the request processing sub-system 204 may transmit this unique customer identifier to the text-encoding sub-system 208 along with the request to encode this identifier into the text-based information. However, if the request processing sub-system 204 utilizes a UUID or an API-specific customer identifier, the request processing sub-system 204 may generate this identifier in response to the customer 218 request and pass the identifier to the text-encoding sub-system 208.

The text-encoding sub-system 208 is a computer system of the service provider 202 or an application installed on a computer system of the service provider 202 that obtains text-based information vended by the service provider 202 to customers and encodes information into the text-based information to enable the service provider 202 to detect unauthorized use of the text-based information by a customer 218 or other entity. In response to the request from the request processing sub-system 204, the text-encoding sub-system 208 obtains, from an original text database 210, the unaltered text-based information 214 that includes the information requested by the customer 218. The text-encoding sub-system 208, based at least in part on the unaltered text-based information 214 obtained, determines whether the unaltered text-based information 214 has been previously used to encode other information. For instance, the text encoding sub-system 208 may determine whether a data table corresponding to the text-based information exists that includes an entry for each possible syntactic and semantic change that can be performed, as well as the values corresponding to each possible syntactic and semantic change. If so, the text-encoding sub-system 208 may use this data table to determine what syntactic and/or semantic changes are to be performed in order to encode the unique identifier. For instance, the text encoding sub-system 208 may translate the unique identifier into a bit string using the bit configuration of the data table corresponding to the possible syntactic and semantic changes applicable to the text-based information. The text-encoding sub-system 208, using the bit string for the unique identifier and the data table, selects the syntactic and semantic changes to be performed and modifies the unaltered text-based information 214 accordingly to generate the text-based transmission 216 that is to be provided to the customer 218.

In an embodiment, if the unaltered text-based information 214 has not been previously used to encode information (e.g., no data table is available illustrating available syntactic and semantic changes), the text encoding sub-system 208 evaluates the unaltered text-based information 214 to identify possible transformations that can be used to encode information. For instance, the text encoding sub-system 208 utilizes a grammar-based application to identify potential grammatical changes that may be made to the unaltered text-based information 214 to encode information. Additionally, the text encoding sub-system 208 may utilize a thesaurus application to identify synonyms that can be used for semantic transformations within the unaltered text-based information 214. In an embodiment, the text encoding sub-system 208 also utilizes a syntactic alteration algorithm to identify words that may be modified to encode information in a manner that renders these words human-readable but with syntax errors. This algorithm may take into account the rate at which these words are misspelled or subject to regional differences (e.g., center vs. centre, favor vs. favour, etc.). Upon identifying the possible syntactic and semantic changes that may be performed to encode information, the text encoding sub-system 208 constructs a data table for the unaltered text-based information 214 that is usable to identify the syntactic and semantic changes that may be performed to encode a particular unique identifier. This new data table may be maintained by the text encoding sub-system 208 within a database for future use and may be associated with an identifier corresponding to the unaltered text-based information 214.

The text encoding sub-system 208 may store the text-based transmission 216 generated using the unaltered text-based information 214 in an encoded text database 212. The encoded text database 212 may include previously generated text-based transmissions supplied to customers of the service provider 202. As will be described in greater detail below, the encoded text database 212 is used to identify text-based transmissions that may have been compromised through unauthorized dissemination to other entities. For instance, the service provider 202 may evaluate data logs from other entities (e.g., other users, other web servers, security monitoring systems, etc.) and compare these data logs to the text-based transmissions stored in the encoded text database 212 to determine whether any text-based transmissions stored in the encoded text database 212 has been compromised. If so, the service provider 202 may perform remedial operations to address the unauthorized dissemination of the text-based information.

In an embodiment, the text encoding sub-system 208 also updates the customer profile to include an identifier corresponding to the text-based transmission 216 that is provided to the customer 218. This enables the service provider 202 to quickly identify the customer 218 should the text-based transmission 216 be compromised. The text-encoding sub-system 208 may transmit the text-based transmission 216, which includes the encoded information (e.g., the unique identifier), to the request processing sub-system 204 for dissemination to the customer 218. The request processing sub-system 204, in some instances, may provide the customer 218 additional information specifying the customer's responsibility in not using the text-based information 216 in an unauthorized manner and/or to inform the service provider 202 in the event that the text-based transmission 216 is compromised.

Figure 3:
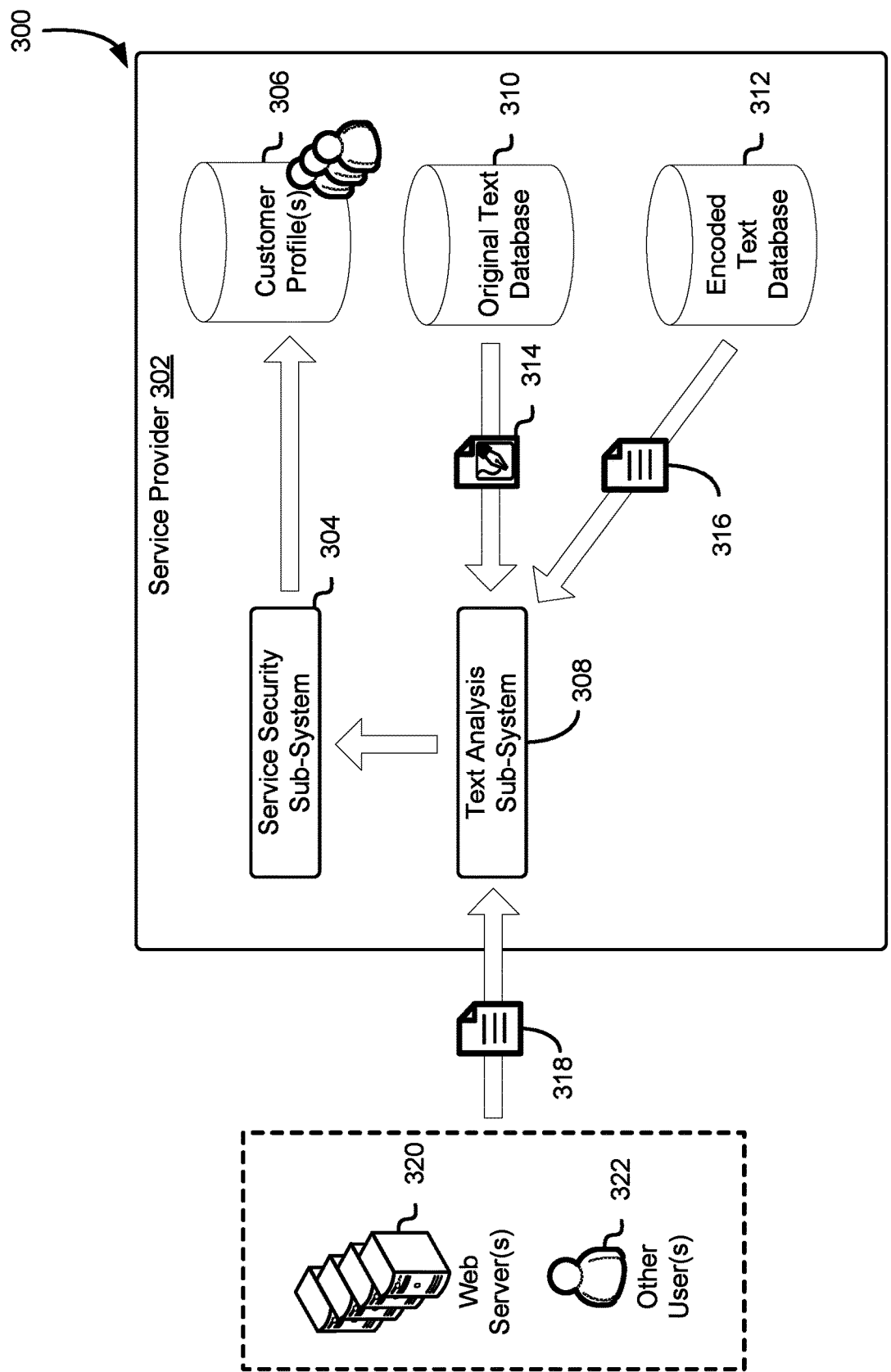
FIG. 3 shows an illustrative example of an environment in which a text-based transmission is evaluated to identify encoded information and determine based at least in part on the encoded information a source for leakage of the transmission in accordance with at least one embodiment.

As noted above, the service provider may monitor data logs and other transmissions from web servers and users to determine whether a text-based transmission, vended by the service provider to a customer, has been compromised or otherwise disseminated without authorization from the service provider. The service provider may evaluate the received data logs and other transmissions against the text-based transmissions previously provided by the service provider to identify any compromised text-based transmissions. If any compromised text-based transmissions are identified, the service provider may evaluate the text-based transmissions to identify the encoded information and utilize the encoded information to identify the customers to which the information was vended. Accordingly, FIG. 3 shows an illustrative example of an environment 300 in which a text-based transmission is evaluated to identify encoded information and determine based at least in part on the encoded information a source for leakage of the transmission in accordance with at least one embodiment.

In the environment 300, a text analysis sub-system 308 of the service provider 302 receives one or more data logs 318 and other transmissions from a variety of external sources. The text analysis sub-system 308 is a computer system of the service provider 302 or an application installed on a computer system of the service provider 302 that evaluates data from external sources to detect unauthorized dissemination of text-based transmissions to other entities. In some embodiments, the text analysis sub-system 308 is a stand-alone system, separate from the service provider 302, which performs the aforementioned operations. The text analysis sub-system 308 may query one or more web servers 320 external to the service provider 302 to obtain data logs 318 from these web servers 320. These data logs 318 may include information provided by the web servers 320 to users, such as product information, text documents, and the like. Further, the data logs 318 may specify identifiers corresponding to users that accessed this information. In some embodiments, the text analysis sub-system 308 receives data logs 318 and other transmissions from other users 322. For instance, a customer of the service provider 302 may indicate to the text analysis sub-system 308 that information vended to the customer has been compromised. Alternatively, the text analysis sub-system 308 may evaluate data logs corresponding to user interactions through the service provider 302 with other entities.

In an embodiment, the text analysis sub-system 308 determines whether information specified in the data logs 318 and other external sources of data were used legitimately. For instance, if the data logs 318 are obtained from a third-party that is authorized to use text-based information from the service provider 302, the text analysis sub-system 308 may disregard the text-based information specified in the data logs 318. This may reduce the analysis required to evaluate text-based information from external sources. In some instances, the text analysis sub-system 308 may identify corresponding text-based transmissions 316 and unaltered text-based information 314 based at least in part on other information from the third-party sources. For example, the text analysis sub-system 308 may evaluate information from a website where the text-based information is specified to identify a subset of text-based transmissions from the encoded text database 312 and the unaltered text-based information 314 without having to perform an exhaustive analysis of all entries in the encoded text database 312 and the original text database 310.

The text analysis sub-system 308 may evaluate the data logs 318 and other information obtained from the web servers 320, other users 322, and any other sources to determine whether the data logs 318 and the other information include previously vended text-based transmissions. For instance, the text analysis sub-system 308 may access the encoded text database 312 to identify text-based transmissions previously provided by the service provider 302. The text analysis sub-system 308 may evaluate the data logs 318 and other information against these text-based transmissions to identify one or more text-based transmissions 316 specified in these data logs 318 or otherwise disseminated without authorization by the service provider 302. If the text analysis sub-system 308 identifies a compromised text-based transmission 316, the text analysis sub-system 308 identifies, from the encoded text database 312, an identifier corresponding to the unaltered text-based information used to encode information and create the text-based transmission 316.

The text analysis sub-system may access the original text database 310 to obtain the unaltered text-based information 314 originally used to create the text-based transmission 316. For instance, using the identifier obtained from the encoded text database 312, the text analysis sub-system 308 queries the original text database 310 to obtain the unaltered text-based information 314 and a data table usable to identify the possible syntactic and semantic alterations that can be performed to alter the unaltered text-based information 314 to insert encoded information. Further, the data table is usable by the text analysis sub-system 308 to translate syntactic and semantic transformations present in the identified text-based transmission 316 into a bit string corresponding to a unique identifier of a customer or of the request fulfilled by the service provider 302 to generate the identified text-based transmission 316.

Upon obtaining the unaltered text-based information 314 from the original text database 310, the text analysis sub-system 308 may compare the text-based transmission 316 identified from the data logs 318 or other provided information to the unaltered text-based information 314 to obtain the encoded information. Using the data table from the original text database 310, the text analysis sub-system 308 may convert the encoded information into a unique identifier that may correspond to a particular customer or request fulfilled by the service provider 302. In an embodiment, the text analysis sub-system 308 transmits the unique identifier, as well as information regarding the unauthorized dissemination of the text-based transmission 316 (e.g., where the unauthorized dissemination occurred, the number of instances of unauthorized dissemination, etc.) to a service security sub-system 304 for performance of remedial operations.

The service security sub-system 304 is a computer system of the service provider 302 or an application installed on a computer system of the service provider 302 that performs one or more remedial operations to mitigate further unauthorized dissemination of text-based transmissions vended by the service provider 302. In some embodiments, the service security sub-system 304 is a stand-alone service that interacts with the service provider 302 to obtain information usable to perform remedial operations on behalf of the service provider 302. In response to receiving the unique identifier and other information from the text analysis sub-system 308, the service security sub-system 304 may query the customer profile database 306 to determine whether the unique identifier corresponds to a particular customer. For instance, if the unique identifier is a customer identifier (e.g., the identifier of the customer that invoked an API to generate the text-based transmission 316), the service security sub-system 304 may identify the customer profile corresponding to the customer identifier. Alternatively, if the unique identifier is a UUID that is unique to the request, the service security sub-system 304 may query the customer profile database 306 to identify a customer profile that specifies the UUID.

In an embodiment, if the unique identifier does not correspond to a particular customer profile, the service security sub-system 304 may transmit a request to the text analysis sub-system 308 to obtain the bit string corresponding to the unique identifier. The service security sub-system 304 may perform minor variations on the bit string to obtain other unique identifiers. For instance, the service security sub-system 304 may coordinate with the text analysis sub-system 308 to identify potential syntactic and semantic changes that are not present in the text-based transmission 316. To generate other possible unique identifiers, the text analysis sub-system 308 may adjust the bit string corresponding to the originally identified unique identifier to identify other possible bit strings. This may include applying a syntactic or semantic change to the text-based transmission 316 where previously there was no change. The text analysis sub-system 308 may pass these newly identified unique identifiers to the service security sub-system 304 for evaluation. Using these newly identified unique identifiers, the service security sub-system 304 may query the customer profile database 306 to identify any customer profiles that are associated with these newly identified unique identifiers.

Once the service security sub-system 304 has identified the one or more customers that may have disseminated the text-based transmission 316 without authorization, the service security sub-system 304 may perform one or more remedial operations to address the unauthorized dissemination of the text-based transmission 316. For example, the service security sub-system 304 may suspend the accounts of the customers identified as having disseminated the text-based transmission 316 to other entities without authorization. Additionally, or alternatively, the service security sub-system 304 may transmit a notification to each identified customer to indicate that a text-based transmission vended to the customer has been compromised. Further, the notification would indicate that the customer has a limited period of time to address any issues that may have led to the unauthorized dissemination before the customer's account is suspended. In some embodiments, the service security sub-system 304 may flag the identified customer profiles. This may cause the service provider 302 to limit further dissemination of text-based information to these particular customers. Further, if more than one customer is identified as having potentially disseminated the text-based transmission, this may enable the service provider 302 to encode additional information that may be used to more accurately identify the actual customer disseminating information without authorization. In some instances, the service security sub-system 304 may restrict customer access to sensitive information while continuing to enable the customer's access to other information that is not subject to security restrictions or heightened permissions.

Figure 4:
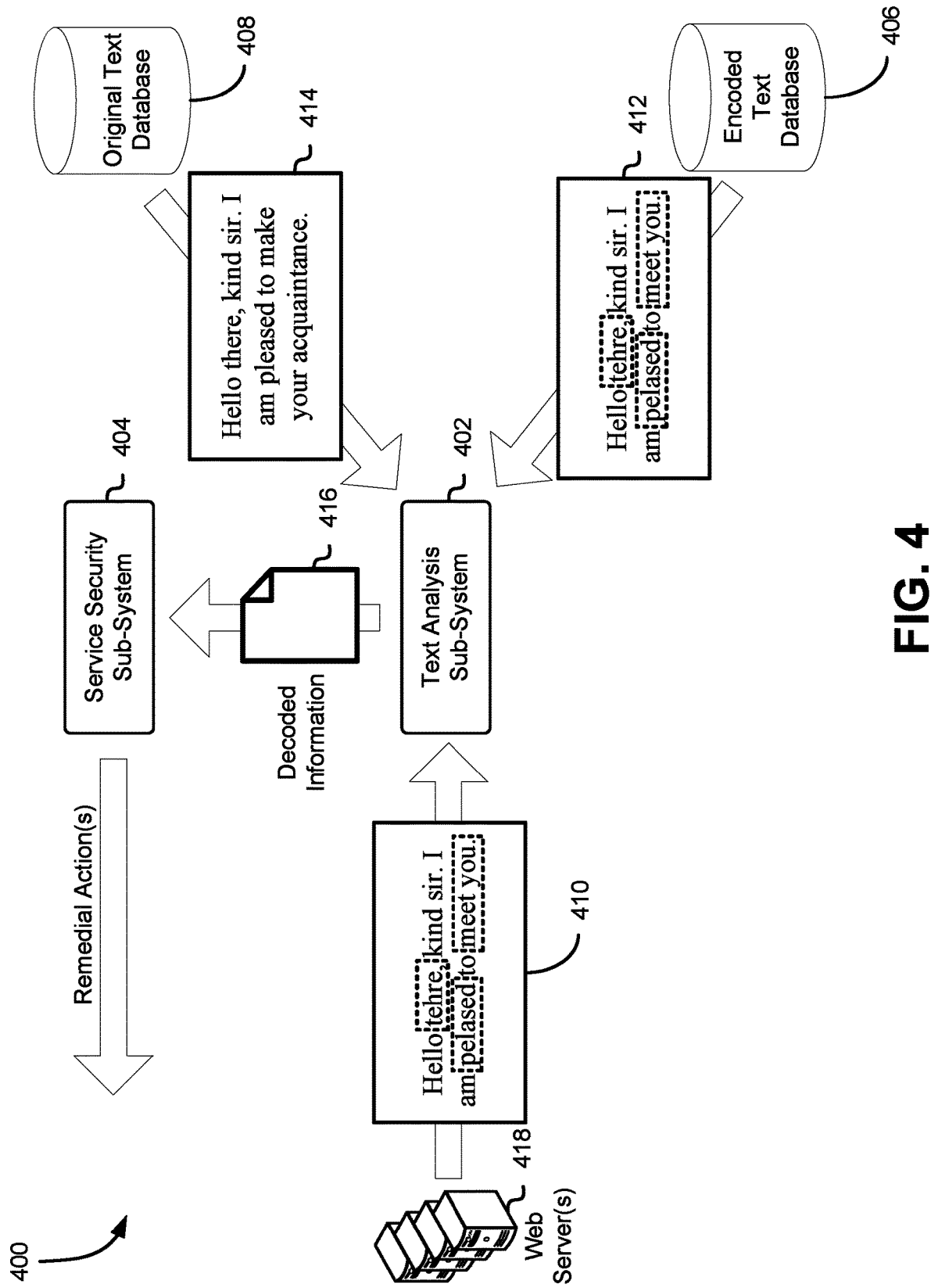
FIG. 4 shows an illustrative example of an environment in which a text analysis sub-system of a service provider evaluates a text-based transmission that includes encoded information against an original text-based information to identify the encoded information in accordance with at least one embodiment.

As noted above, the text analysis sub-system may compare a text-based transmission specified in a data log and stored in an encoded text database to the original, unaltered text-based information to identify encoded information. The text analysis sub-system may utilize a data table that specifies possible syntactic and semantic transformations and the corresponding bit values to decode the encoded information and obtain a unique identifier corresponding to a particular customer or to the request fulfilled by the service provider resulting in the text-based transmission. This decoded information may be utilized by the service security sub-system to identify the customer that disseminated the text-based transmission without authorization from the service provider and to perform remedial actions to address the issue. Accordingly, FIG. 4 shows an illustrative example of an environment 400 in which a text analysis sub-system 402 of a service provider evaluates a text-based transmission 412 that includes encoded information against an original text-based information 414 to identify the encoded information in accordance with at least one embodiment.

In the environment 400, the text analysis sub-system 402 obtains one or more data logs from one or more web servers 418 or other users. The text analysis sub-system 402 is similar or identical to the text analysis sub-system 308 described above in connection with FIG. 3. The one or more data logs may include a text-based transmission 410 that was obtained without authorization by the one or more web servers 418 via another entity (e.g., the customer to which the text-based transmission 410 was vended, another user, etc.). The text analysis sub-system 402 may evaluate the one or more data logs from the web servers 418 against the text-based transmissions 412 stored within the encoded text database 406 maintained by the service provider. If the text analysis sub-system 402 identifies a text-based transmission 412 that matches a text-based transmission 410 specified in the data logs, the text analysis sub-system 402 may obtain, from the original text database 408, the unaltered text-based information 414 that was used to generate the text-based transmission 412. Further, the text analysis sub-system 402 may obtain a data log that specifies the possible syntactic and semantic changes that are performable on the unaltered text-based information 414 to generate text-based transmissions that included encoded information. This data table may be used to obtain and decode the encoded information in the text-based transmission 412.

In some instances, the data logs may include a text-based transmission 410 that does not match any text-based transmissions from the encoded text database 406. The text analysis sub-system 402 may evaluate the text-based transmission 410 in the data logs and compare this text-based transmission 410 to the sets of unaltered text-based information stored in the original text database 408. The text analysis sub-system 402 may obtain, for each text-based information 414, the corresponding data table specifying the possible syntactic and semantic transformations available for encoding a unique identifier associated with a customer or a request. The text analysis sub-system 402 use the data table to identify any syntactic or semantic changes, as well as any unchanged portions of the text-based transmission 410 to identify corresponding unaltered text-based information 414. Thus, the text analysis sub-system 402 may identify the unaltered text-based information 414 without accessing the encoded text database 406 and comparing a text-based transmission 412 to the unaltered text-based information 414.

The text analysis sub-system 402 may use either the text-based transmission 410 from the data log or the text-based transmission 412 from the encoded text database 406 and compare this to the unaltered text-based information 414 to obtain the encoded information. Using the data table from the original text database 408, the text analysis sub-system 402 may identify the syntactic and semantic changes made to the unaltered text-based information 414 to generate the text-based transmission 412. For example, as illustrated in FIG. 4, the unaltered text-based information 414 (e.g., "Hello there, kind sir. I am pleased to make your acquaintance.") has been modified to create the text-based transmission 412 (e.g., "Hello tehre, kind sir. I am pelased to meet you."), where the text-based transmission 412 includes two syntactic transformations (e.g., "tehre" and "pelased") and one semantic change (e.g., "meet you" instead of "make your acquaintance"). Each of these changes may correspond to a particular bit value within a bit string for the unaltered text-based information 414. By using these bit values and positions within the bit string, the text analysis sub-system 402 may obtain a bit string corresponding to the encoded information in the text-based transmission 412. The text analysis sub-system 402 may use this bit string, along with the data table for the unaltered text-based information 414, to decode the encoded information and obtain the decoded information 416. The decoded information 416 may include the unique identifier assigned to the customer to which the text-based transmission 412 was vended or to the request from the customer for the text-based transmission 412.

The text analysis sub-system may transmit the decoded information 416 to the service security sub-system 404 for performance of remedial operations. The service security sub-system 404 is similar or identical to the service security sub-system 304 described above in connection with FIG. 3. The service security sub-system 404 may use the decoded information 416 to identify a customer profile that is associated with the unique identifier specified in the decoded information 416. For instance, a customer profile may specify a unique customer identifier assigned by the service provider to the customer upon creation of the profile. Alternatively, the customer profile may be updated to specify an API-specific customer identifier or a UUID in response to a request from the customer to obtain the text-based transmission 412. Thus, the service security sub-system 404 may query the customer profiles to identify a profile that specifies the identifier in the decoded information 416.

The service security sub-system 404, upon identifying the corresponding customer profile to which the text-based transmission 412 was vended, may determine what remedial operations are to be performed to address the unauthorized dissemination of the text-based transmission 412. For instance, the service security sub-system 404 may suspect the customer's account, thus preventing the customer from obtaining additional text-based transmissions until the suspension is lifted. Additionally, or alternatively, the service security sub-system 404 may transmit a notification to the customer to indicate that the text-based transmission 412 has been compromised.

In some instances, the decoded information 416 obtained by the service security sub-system 404 may not match any unique identifiers specified in the customer profiles maintained by the security service. If so, the service security sub-system 404 may transmit a request to the text analysis sub-system 402 to obtain the bit string corresponding to the decoded information 416. The service security sub-system 404 may perform variations on the bit string to obtain other decoded information (e.g., other unique identifiers), as described above. The text analysis sub-system 402 may pass the new decoded information to the service security sub-system 404 for evaluation. Using this new decoded information, the service security sub-system 404 may query the various customer profiles to identify any customer profiles that are associated with these newly identified unique identifiers specified in the new decoded information. The service security sub-system 404 may perform any of the remedial operations as discussed above.

Figure 5:
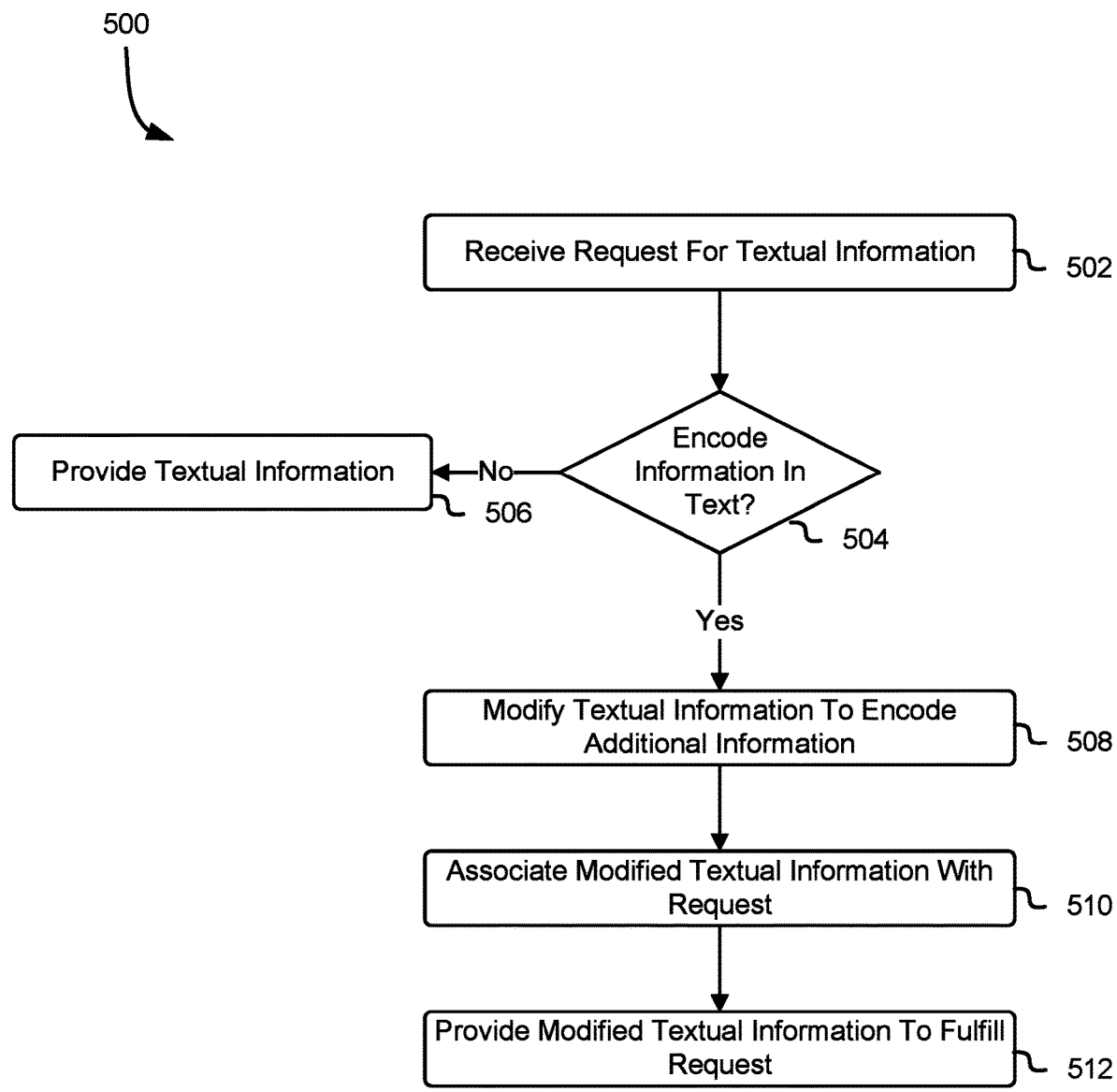
FIG. 5 shows an illustrative example of a process for modifying a text-based transmission to include encoded information usable to identify an entity to which the text-based transmission is provided in accordance with at least one embodiment.

As noted above, a request processing sub-system of a service provider may receive a request from a customer to obtain a text-based transmission that is subject to restrictions imposed by the service provider with regard to dissemination of the text-based transmission to unauthorized entities or to use for any other purpose that that specified by the service provider. In response to the request, the request processing sub-system may generate or otherwise utilize a unique identifier corresponding to the customer or the request and, via a text encoding sub-system, encode this unique identifier into the text-based transmission using syntactic and/or semantic transformations of the text specified in the transmission. Accordingly, FIG. 5 shows an illustrative example of a process 500 for modifying a text-based transmission to include encoded information usable to identify an entity to which the text-based transmission is provided in accordance with at least one embodiment. The process 500 is performed by the aforementioned request processing sub-system of the service provider, in conjunction with a text encoding sub-system of the service provider, which may encode a unique identifier into the textual information to be vended to the requestor.

At any time, the request processing sub-system may receive 502 a request from a customer of the service provider to obtain a text-based transmission that includes textual information. In one embodiment, the customer transmits an API request, which specifies an identifier or other information usable to identify the textual information requested from the customer, as well as credential information usable to authenticate the customer and determine whether the customer is authorized to obtain the requested textual information. The request processing sub-system may evaluate the credential information to determine whether the customer can be authenticated and, if so, whether the customer is authorized to access the requested textual information. If the customer cannot be authenticated or the customer is not authorized to access the requested textual information, the request processing sub-system may deny the request.

The request processing sub-system, based at least in part on the credential information provided in the request and the requested textual information, may determine 504 whether to encode information into the text. For instance, the requested textual information may be subject to one or more policies, whereby a unique identifier associated with the customer or the request itself is to be encoded into the textual information to detect unauthorized use of the textual information. If the request processing sub-system determines that no information is to be encoded into the text, the request processing sub-system may obtain the textual information from the original text database (described above in connection with FIG. 2) and provide 506 the textual information to the customer to fulfill the request.

If the request processing sub-system determines that the textual information is to be modified to encode additional information (e.g., a unique identifier), the request processing sub-system may transmit a request to the text encoding sub-system to encode the additional information into the textual information. The request may include an identifier corresponding to the original textual information as well as the unique identifier that is to be encoded into the textual information. In response to the request, the text encoding sub-system may obtain, from the original text database, the original textual information. Further, the text encoding sub-system may obtain a data table corresponding to the original textual information, which may specify the possible syntactic and semantic transformations that may be executed to encode information. If the data table is not available (e.g., the original textual information has not been used previously to encode information), the text encoding sub-system may evaluate the original textual information to identify possible syntactic and semantic transformations usable to encode possible information. For example, if the unique identifiers are subject to a bit limit, the text encoding sub-system may identify the various syntactic and semantic transformations that can be used to encode unique identifiers up to or beyond the bit limit.

Using the data table and the unique identifier from the request processing sub-system, the text encoding sub-system may identify the syntactic and/or semantic transformations that may be used to encode the unique identifier or other additional information. This may include transforming the unique identifier into a bit string and using this bit string to identify the corresponding transformations specified in the data table that correspond to the bits of the bit string. Based at least in part on the identified syntactic and/or semantic transformations, the text encoding sub-system may modify 508 the textual information to encode the additional information. Further, the text encoding sub-system may associate 510 the modified textual information with the request. For instance, the text encoding sub-system may store the modified textual information in a customer profile associated with the requestor. Additionally, or alternatively, the text encoding sub-system may update a database comprising pairings of requestors and modified textual information entries to associate an identifier of the requestor with an entry corresponding to the modified textual information. The text encoding sub-system may store the modified textual information in an encoded text database, as illustrated in FIG. 2 and described above. The text encoding sub-system may provide 512 the modified textual information to the request processing sub-system to fulfill the request. This enables the request processing sub-system to vend the information to the requestor.

Figure 6:
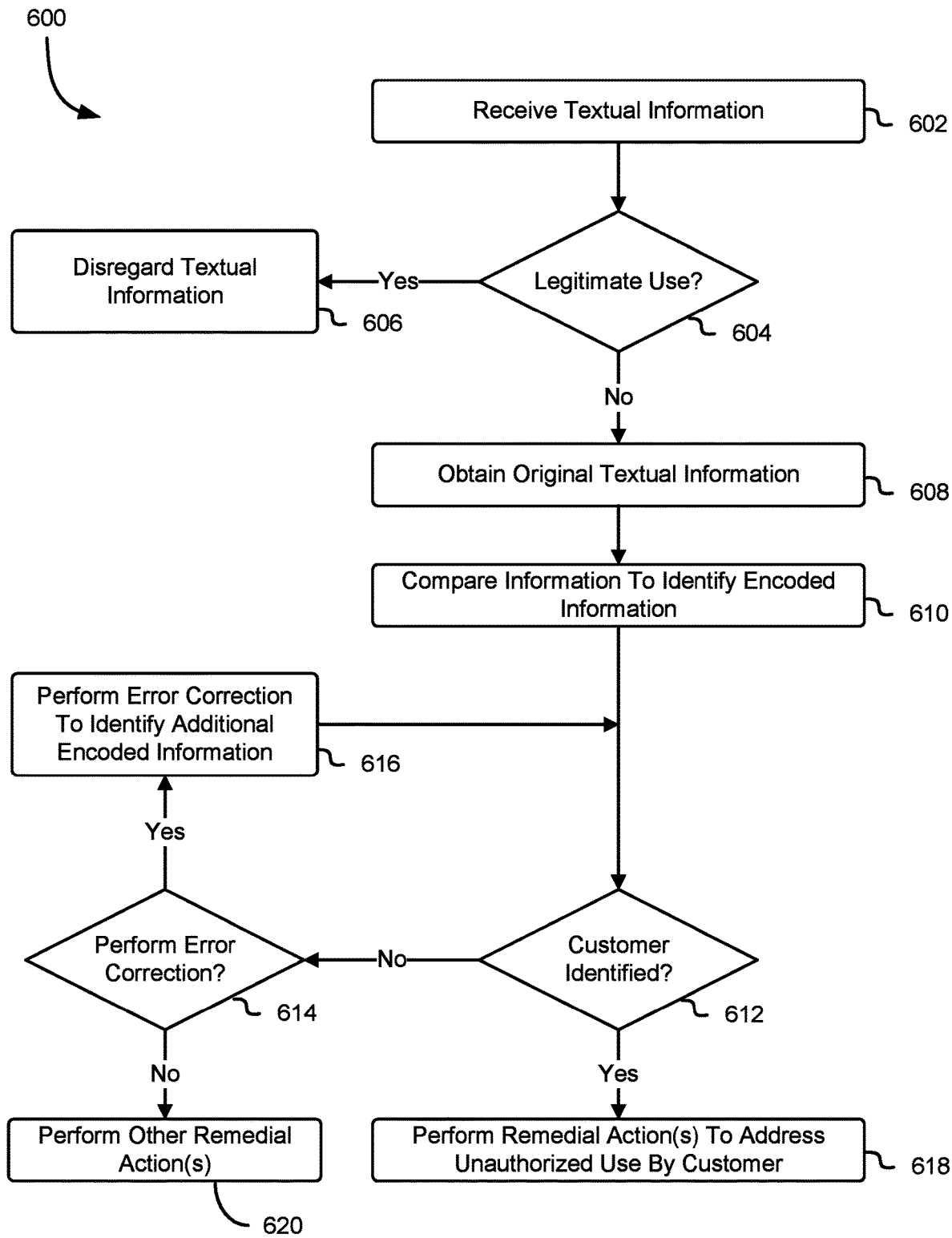
FIG. 6 shows an illustrative example of a process for evaluating encoded information in a text-based transmission to identify an entity to which the text-based transmission was provided and perform remedial operations in accordance with at least one embodiment.

As noted above, a text analysis sub-system of a service provider may obtain data logs and other information from third-party sources (e.g., web servers for other service providers or companies, users, security firms, etc.) that may include textual information vended by the service provider to a customer. This textual information may include encoded information that corresponds to a unique identifier of the customer or of the request received by the service provider to vend the textual information. The text analysis sub-system may determine whether the textual information corresponds to any original, unaltered textual information maintained by the service provider. If so, the text analysis sub-system may compare the information to obtain encoded information. Using this encoded information, the text analysis sub-system may identify the customer to which the textual information was vended. Further, the text analysis sub-system may submit the customer's identifier and other information regarding the dissemination of the textual information to a service security sub-system for performance of remedial actions. Accordingly, FIG. 6 shows an illustrative example of a process 600 for evaluating encoded information in a text-based transmission to identify an entity to which the text-based transmission was provided and perform remedial operations in accordance with at least one embodiment. The process 600 is performed by the text analysis sub-system described above.

The text analysis sub-system may, periodically or in response to a triggering event (e.g., receipt of a notification indicating a security breach, receipt of a fraud alert, etc.), query third-party sources to obtain various data logs and other information that may include textual information previously vended to one or more customers of the service provider. The text analysis sub-system may evaluate the data logs and other information to receive 602 textual information that is specified therein. For instance, the text analysis sub-system may evaluate the data logs and other information from third-party sources against previously vended text-based transmissions stored in the encoded text database (described above in connection with FIGS. 2-4) to determine whether these data logs or other information include textual information vended by the service provider to customers. If the text analysis sub-system identifies a compromised text-based transmission, the text analysis sub-system identifies, from the encoded text database, an identifier corresponding to the original textual information used to encode information and create the text-based transmission.

In response to receiving the textual information, the text analysis sub-system may determine 604 whether the received textual information was legitimately used. For instance, if the textual information is obtained from a third-party that is authorized to utilize the textual information, the text analysis sub-system may determine that no further analysis is required. Thus, the text analysis sub-system may disregard 606 this textual information and await receipt of new textual information for analysis. Similarly, if the textual information obtained by the text analysis sub-system was disseminated by a user authorized to perform such dissemination, the text analysis sub-system may determine that this is a legitimate use of the textual information and disregard 606 the textual information.

If the received textual information was not used in a legitimate manner, the text analysis sub-system may obtain 608 the original textual information from the original text database and compare 610 the text-based transmission to the original textual information to identify the encoded information included therein. For instance, the text analysis sub-system may obtain, from the original text database, the unaltered text-based information and a data table usable to identify the possible syntactic and semantic alterations that can be performed to alter the unaltered text-based information to insert the encoded information. Further, the data table is usable by the text analysis sub-system to translate syntactic and semantic transformations present in the identified text-based transmission into a bit string corresponding to a unique identifier of a customer or of the request fulfilled by the service provider to generate the identified text-based transmission. Using the data table from the original text database, the text analysis sub-system may convert the encoded information into a unique identifier that may correspond to a particular customer or request fulfilled by the service provider. The text analysis sub-system may transmit the unique identifier and information regarding the dissemination of the text-based transmission to a service security sub-system to address any unauthorized disseminations of the transmission. The service security sub-system may evaluate the unique identifier to determine 612 whether a customer of the service provider has been identified. The service security sub-system may query a customer profile database to determine whether a customer profile includes the unique identifier. If so, then a customer is identified.

If the unique identifier does not correspond to a particular customer profile, the service security sub-system may transmit a request to the text analysis sub-system to obtain the bit string corresponding to the unique identifier. The service security sub-system may determine 614 whether to perform one or more error correction processes to potentially identify a set of customer that may have disseminated the text-based transmission without authorization. For instance, the service security sub-system may transmit a request to the text analysis sub-system to obtain the bit string corresponding to the unique identifier. The service security sub-system may perform 616 error correction processes, including minor variations on the bit string, to identify additional encoded information and obtain other unique identifiers. For instance, the service security sub-system may coordinate with the text analysis sub-system to identify potential syntactic and semantic changes that are not present in the text-based transmission.

To generate other possible unique identifiers, the text analysis sub-system may adjust the bit string corresponding to the originally identified unique identifier to identify other possible bit strings. This may include applying a syntactic or semantic change to the text-based transmission where previously there was no change. The text analysis sub-system may pass these newly identified unique identifiers to the service security sub-system for evaluation. Using these newly identified unique identifiers, the service security sub-system may query the customer profile database to identify any customer profiles that are associated with these newly identified unique identifiers. In an embodiment, the text-based information is encoded with additional bits in order to enable use of an error correction algorithm to obtain the encoded information. Thus, if a number of transformations are removed by another entity (e.g., correction of spelling errors, correction of punctuation errors, etc.), the text analysis sub-system may still be able to obtain the encoded information using the remaining bits in the obtained textual information.

If no error correction is to be performed, the service security sub-system may perform 620 other remedial actions to address the unauthorized dissemination of text-based transmissions. For instance, the service security sub-system may revise the original textual information to create a new baseline for syntactic and semantic transformations. This new baseline may thus be provided by the service provider to customers in response to requests to obtain textual information. Further, the service security sub-system may remove the original textual information from the original text database, thus making it unavailable for further modification and dissemination.

If the one or more unique identifiers correspond to one or more customers, the service security sub-system may perform 618 a set of remedial actions to address unauthorized use of the text-based transmission by the one or more customers. For example, the service security sub-system may suspend the accounts of the customers identified as having disseminated the text-based transmission to other entities without authorization. Additionally, or alternatively, the service security sub-system may transmit a notification to each identified customer to indicate that a text-based transmission vended to the customer has been compromised. Further, the notification would indicate that the customer has a limited period of time to address any issues that may have led to the unauthorized dissemination before the customer's account is suspended. In some embodiments, the service security sub-system may flag the identified customer profiles. This may cause the service provider to limit further dissemination of text-based information to these particular customers. Further, if more than one customer is identified as having potentially disseminated the text-based transmission, this may enable the service provider 302 to encode additional information that may be used to more accurately identify the actual customer disseminating information without authorization.

Figure 7:
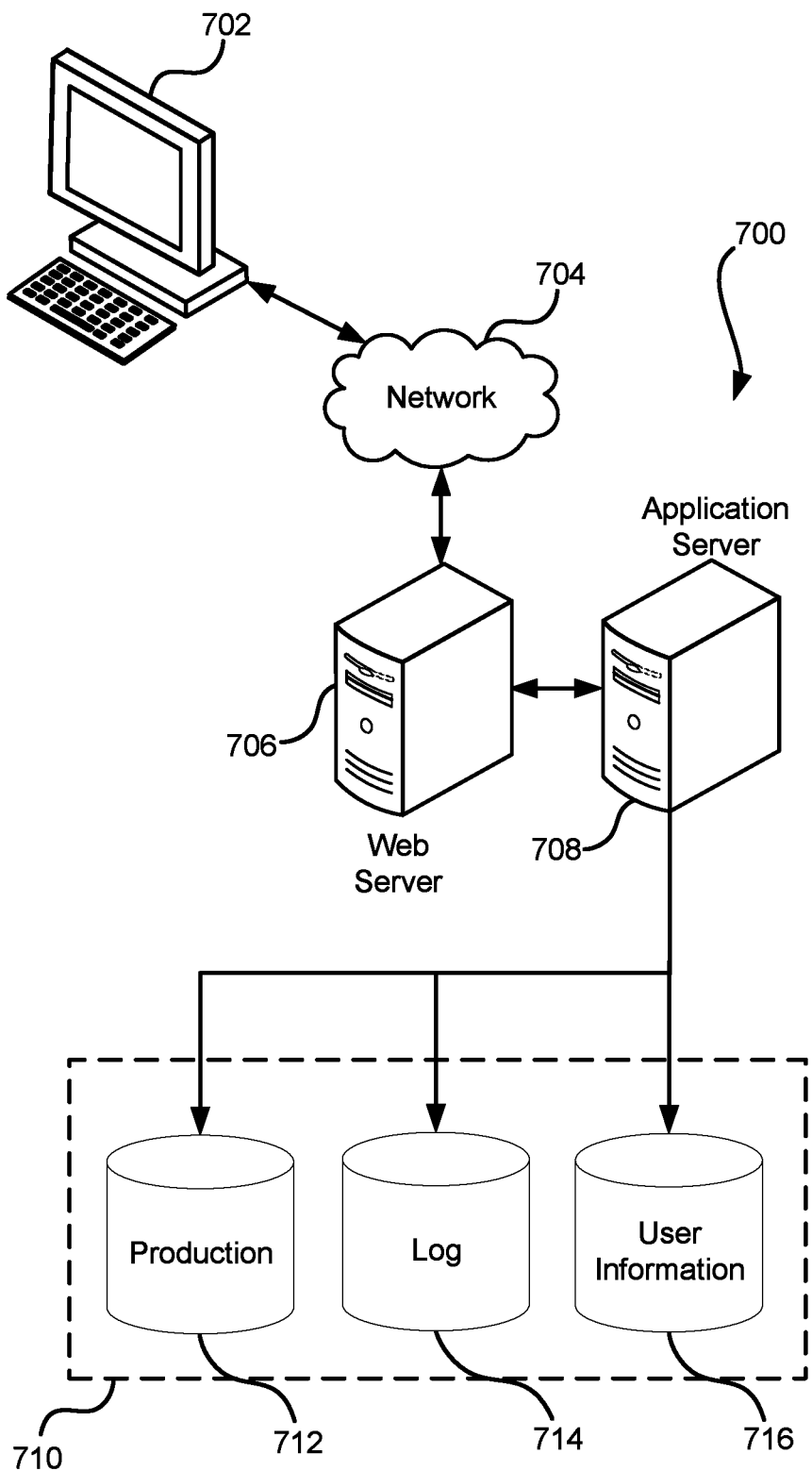
FIG. 7 illustrates an environment in which various embodiments can be implemented.

FIG. 7 illustrates aspects of an example system 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages, or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 702 and the application server 708, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving a request to obtain a text-based transmission, the request specifying a first identifier corresponding to text-based information to be provided;
    using the first identifier to obtain the text-based information;
    generating a second identifier corresponding to the request, whereby the second identifier is distinct from other identifiers corresponding to other requests for text-based transmissions;
    determining, based at least in part on the second identifier and the text-based information, a set of textual transformations to associate with the second identifier, the set of textual transformations usable to determine how to modify the text-based information to encode the second identifier;
    modifying the text-based information by performing the set of textual transformations to encode the second identifier in the text-based information, wherein the text-based information is decodable to obtain the second identifier;
    providing modified text-based information as the text-based transmission;
    receiving an unverified text-based transmission;
    comparing the unverified text-based transmission to the text-based information to identify a set of differences;
    determining that the set of differences does not correspond to the set of textual transformations;
    determining that modification to the set of differences results in the set of textual transformations; and
    providing a response indicating that the text-based information has been compromised, based at least in part on the determination that the modification to the set of differences results in the set of textual transformations.

2. The computer-implemented method of claim 1, wherein:
    the determination is that the set of differences correspond to the set of textual transformations associated with the second identifier;
    the method further comprises determining, based at least in part on the determination, that the text-based information has been compromised; and
    providing the response includes performing a remedial action as a result of the text-based information having been compromised.

3. The computer-implemented method of claim 1, wherein the set of textual transformations include making at least one semantic transformation to a portion of the text-based information.

4. The computer-implemented method of claim 1, wherein the set of textual transformations include making at least one syntactic transformation to a portion of the text-based information.

5. A system, comprising:
    at least one processor; and
    memory comprising instructions that, as a result of execution by the at least one processor of the system, cause the system to at least:

identify text-based information for distribution;
generate an identifier usable to detect unauthorized use of the text-based information;
determine, based at least in part on the identifier and the text-based information, a set of textual transformations to associate with the identifier, the set of textual transformations usable to determine how to modify the text-based information to encode the identifier;
modify the text-based information by performing the set of textual transformations to encode the identifier within the text-based information, wherein the text-based information is decodable to obtain to the identifier;
provide modified text-based information;
compare an unverified text-based transmission to the text-based information to identify a set of differences;
determine that the set of differences does not correspond to the set of textual transformations;
determine that modification to the set of differences results in the set of textual transformations; and
provide a response indicating an unauthorized use of the text-based information, based at least in part on the determination that modification to the set of differences results in the set of textual transformations.

6. The system of claim 5,
wherein the memory comprises further instructions that, as a result of execution by the at least one processor, cause the system to at least:
identify, based at least in part on the set of textual transformations, an entity to which the modified text-based information was provided; and
transmit, via the response, a notification to the entity indicating that the text-based information has been compromised.

7. The system of claim 5, wherein the identifier is a Universally Unique Identifier associated with an entity to which the text-based information is provided.

8. The system of claim 5, the memory comprising further instructions that, as a result of execution by the at least one processor, cause the system to at least:
receive a request to obtain the text-based information;
generate a second identifier corresponding to the request, the second identifier being different from the identifier;
determine, based at least in part on the second identifier and the text-based information, a second set of textual transformations to associate with the second identifier, the second set of textual transformations being different from the set of textual transformations;
modify the text-based information by performing the second set of textual transformations to encode the second identifier in the text-based information; and
provide second modified text-based information.

9. The system of claim 5, wherein the set of textual transformations include making at least one punctuation change to the text-based information.

10. The system of claim 5, wherein the identifier is distinct from other identifiers corresponding to other requests for text-based transmissions.

11. A non-transitory computer-readable storage medium comprising executable instructions that, as a result of being executed by one or more processors of a computer system, cause the computer system to at least:
receive a text-based transmission;
compare the text-based transmission to text-based information to identify a set of differences, the set of differences including a first set of textual transformations made to the text-based information;
determine the first set of textual transformations does not match a second set of textual transformations used to encode an identifier of an entity to which the text-based information was provided, wherein the identifier is obtainable by decoding the text-based information;
determine that modification to the first set of textual transformations results in a match with the second set of textual transformations; and
provide a response indicating that the text-based information has been compromised, based at least in part on the determination that modification to the first set of textual transformations matches the second set of textual transformations.

12. The non-transitory computer-readable storage medium of claim 11, wherein the executable instructions, as a result of being executed by the one or more processors of the computing system, further cause the computer system to:
identify the text-based information for distribution;
generate a second identifier, the second identifier usable to detect unauthorized use of the text-based information;
determine, based at least in part on the second identifier and the text-based information, a third set of textual transformations to associate with the second identifier, the third set of textual transformations usable to determine how to modify the text-based information to encode the second identifier;
modify the text-based information in accordance with the third set of textual transformations, resulting in modified text-based information that encodes the second identifier; and
provide the modified text-based information.

13. The non-transitory computer-readable storage medium of claim 11, wherein:
the second set of textual transformations include a set of character set transformations to the text-based information; and
the determination is that the first set of textual transformations matches the second set of textual transformations as a result of the first set of textual transformations including the set of character set transformations.

14. The non-transitory computer-readable storage medium of claim 11, wherein:
the second set of textual transformations include a set of numeric transformations to the text-based information; and
the determination is that the first set of textual transformations matches the second set of textual transformations as a result of the first set of textual transformations including the set of numeric transformations.

15. The non-transitory computer-readable storage medium of claim 11, wherein the identifier corresponds to an application programming interface request submitted to obtain the text-based information.

16. The non-transitory computer-readable storage medium of claim 11, wherein:
as a result of the determination that modification to the first set of textual transformations results in a match with the second set of textual transformations,
wherein the executable instructions, as a result of being executed by the one or more processors of the computing system, further cause the computer system to:
suspend an account of the entity; and
transmit, via the response, a notification to the entity indicating that the account has been suspended.

17. The non-transitory computer-readable storage medium of claim 11, wherein the text-based transmission is obtained from a server operating in a network distinct from the computer system, the server being unauthorized to use the text-based transmission.

18. The system of claim 5, wherein the memory comprising further instructions that, as a result of execution by the at least one processor of the system, cause the system to at least:
   perform a remedial action in response to the unauthorized use of the text-based information.

19. The system of claim 5, wherein the response indicates that a source of the unauthorized use of the text-based information has a limited period of time to resolve the unauthorized use of the text-based information before an account associated with the source is suspended.

20. The system of claim 18, wherein the remedial action comprises suspending an account of a customer identified as the source of the unauthorized use of the text-based information.

* * * * *